(12) United States Patent
Turnbull (10) Patent No.: US 7,957,906 B2
(45) Date of Patent: Jun. 7, 2011

(54) METHOD FOR ATTENUATING LOW FREQUENCY NOISE IN A DUAL-SENSOR SEISMIC STREAMER

(75) Inventor: Neil Turnbull, Edinburgh (GB)

(73) Assignee: PGS Geophysical AS, Lysaker (NO)

( * ) Notice: Subject to any disclaimer, the term of this patent is extended or adjusted under 35 U.S.C. 154(b) by 569 days.

(21) Appl. No.: 12/151,488

(22) Filed: May 7, 2008

(65) Prior Publication Data

US 2009/0281732 A1   Nov. 12, 2009

(51) Int. Cl.
   *G01V 1/36* (2006.01)
(52) U.S. Cl. ............... 702/17; 702/14; 702/16; 702/18; 702/23; 702/24; 702/25; 367/15; 367/21; 367/24
(58) Field of Classification Search .............. 702/14, 702/16, 17, 18, 23, 24, 25; 367/15, 21, 24
   See application file for complete search history.

(56) References Cited

U.S. PATENT DOCUMENTS

| 5,365,492 A | 11/1994 | Dragoset, Jr. |
| 7,359,283 B2 * | 4/2008 | Vaage et al. ............... 367/24 |
| 2005/0195686 A1 | 9/2005 | Vaage et al. |

FOREIGN PATENT DOCUMENTS

| WO | WO 00/57207 | 9/2000 |
| WO | WO 2008/134177 | 11/2008 |
| WO | WO 2009/020719 | 2/2009 |

OTHER PUBLICATIONS

A. Kemal Ozdemir, Philippe Caprioli, (Feb. 2008), "Optimized deghosting of over/under towed-streamer data in the presence of noise", The Leading Edge, vol. 27, No. 2, pp. 190-199.
Sep. 16, 2009, PCT International Search Report.

* cited by examiner

*Primary Examiner* — Sujoy K Kundu
(74) *Attorney, Agent, or Firm* — E. Eugene Thigpen (57) ABSTRACT

A calculated vertical velocity sensor signal is determined from a recorded pressure sensor signal. A constructed vertical velocity sensor signal is determined as a linear combination of the calculated vertical velocity sensor signal and a recorded vertical velocity sensor signal in dual-sensor seismic streamer data, using a mixture coefficient as a proportionality constant. An upgoing pressure wavefield component is determined as one half of a difference of the recorded pressure sensor signal and the constructed vertical velocity sensor signal, as a function of the mixture coefficient. An error in the upgoing pressure wavefield component is determined by propagating errors in the recorded pressure sensor signal and constructed vertical velocity sensor signal terms. A value of the mixture coefficient is determined that minimizes the error in the upgoing pressure wavefield component.

18 Claims, 8 Drawing Sheets

METHOD FOR ATTENUATING LOW FREQUENCY NOISE IN A DUAL-SENSOR SEISMIC STREAMER

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of noise attenuation in dual-sensor marine seismic streamer data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors, also called seismic receivers, at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation will occur at frequencies for which the propagation distance between the detecting hydrophone and the water surface is equal to one-half wavelength. Maximum amplification will occur at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation will occur at a frequency of about 107 Hz and maximum amplification will occur at a frequency of about 54 Hz.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

It is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal. For towed streamer applications, however, the particle motion signal has been regarded as having limited utility because of the high noise level in the particle motion signal. However, if less noisy particle motion signals could be provided for towed streamer acquisition, the effect of the surface reflection could be removed from the data.

It has been difficult to achieve the same bandwidth in the motion sensor data as in the pressure sensor data, however, because of the noise induced by vibrations in the streamer, which is sensed by the particle motion sensors. The noise is, however, mainly confined to lower frequencies. One way to reduce the noise is to have several sensors in series or in parallel. This approach, however, does not always reduce the noise enough to yield a signal-to-noise ratio satisfactory for further seismic processing.

Thus, a need exists for a method for attenuating low frequency noise found in vertical velocity sensor signals when combining pressure sensor and vertical velocity sensor signals in dual-sensor seismic streamer data.

BRIEF SUMMARY OF THE INVENTION

The invention is a method for attenuating low frequency noise in dual-sensor seismic streamer data by combining pressure sensor and vertical velocity sensor signals. A calculated vertical velocity sensor signal is determined from a recorded pressure sensor-signal. A constructed vertical velocity sensor signal is determined as a linear combination of the constructed vertical velocity sensor signal and a recorded vertical velocity sensor signal in the dual-sensor seismic streamer data, using a mixture coefficient as proportionality constant. An upgoing pressure wavefield component is determined as one half of a difference of the recorded pressure sensor signal and the constructed vertical velocity sensor signal, as a function of the mixture coefficient. An error in the upgoing pressure wavefield component is determined by propagating errors in the recorded pressure sensor signal and constructed vertical velocity sensor signal terms. A value of the mixture coefficient is determined that minimizes the error in the upgoing pressure wavefield component.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

A dual-sensor seismic streamer records the seismic wavefield using both pressure and vertical velocity sensors, allowing a subsequent decomposition of the total wavefield into upgoing and downgoing components. The error in the estimate of these components is increased by noise on either sensor, but is reduced by virtue of the statistical independence of the two sensor measurements. Undesirable low-frequency noise on the vertical velocity sensor can be removed before decomposition by replacing the lower frequency portion of the vertical velocity data with a predicted vertical velocity signal calculated from the pressure signal. This prediction takes into account factors which include the properties of the propagation medium, the incidence angle of the incoming energy and the "ghost" which arises from reflection of the seismic wavefield at the sea surface. This replacement process reduces the contribution from the noisier vertical velocity sensor, but at the cost of a reduced statistical independence between noise from the pressure and noise from the modified vertical velocity.

This low frequency replacement process is described more fully in U.S. Pat. No. 7,359,283 B2, of Svein Vaage, et al.; entitled "System for Combining Signals of Pressure Sensors and Particle Motion Sensors in Marine Seismic Streamers"; issued Apr. 15, 2008; and assigned to an affiliated company of the assignee of the present invention. Described is a method for combining signals of a pressure sensor and a particle motion sensor recorded in a marine seismic streamer to reduce noise in the combined pressure sensor signal and particle motion sensor signal, the recorded pressure sensor signal having a bandwidth comprising a first frequency range and a second frequency range, the first frequency range being at lower frequencies than the frequencies of the second frequency range, and the recorded particle motion sensor signal having a bandwidth comprising at least the second frequency range. The method comprises calculating a particle motion sensor signal in the first frequency range from the recorded pressure sensor signal, thereby generating a simulated particle motion sensor signal in the first frequency range; merging the simulated particle motion sensor signal only in the first frequency range with the recorded particle motion sensor signal in the second frequency range to generate a merged particle motion sensor signal having substantially the same bandwidth as the bandwidth of the recorded pressure sensor signal, and combining the recorded pressure sensor signal and the merged particle motion sensor signal for further processing.

The present invention is a method for attenuating low frequency noise in dual-sensor seismic streamer data by combining pressure sensor and vertical velocity sensor signals. In particular, the invention is a method for determining which combination of measured and predicted vertical velocity signals, such as from a low frequency replacement process as described above, may give the best subsequent estimate of the decomposed wavefield. In the general case, the invention determines the best combination by considering the error terms in the original measurements and finding the combination which minimizes a cost function representing the predicted error in the upgoing (or downgoing) wavefield. In the particular embodiment in which the noise is the sole source of error, the measurement noise is considered as a variance term and the cost function is found by an appropriate combination of these variances.

The invention employs the combined signals of pressure sensors (typically hydrophones) and vertical velocity sensors (typically geophones) located in seismic streamers. The combined signals can then be utilized to generate the up- and down-going wavefield components, which are useful for further seismic processing, such as attenuation of multiples in marine seismic data. Since a recorded vertical velocity signal is often contaminated by low frequency noise due to the vibrations typical in a towed streamer, the signal-to-noise ratio for the combined signals would be poor. The vertical velocity signal may be calculated from the pressure sensor signal within a given frequency range if the spectrum of the pressure sensor signal has a satisfactory signal-to-noise ratio within this frequency range (and has no notches within this frequency range) and if the depth of the pressure and vertical velocity sensors is known. If the depth to the sensors is unknown, the depth can be calculated from the frequency of the spectral notches introduced by the surface reflection, a process which is well known in the art.

The low frequency part of the vertical velocity signal will typically need to be replaced because it has a low signal-to-noise ratio. The corresponding portion of the pressure sensor signal to be used for calculating the particle motion signal will typically have a good signal-to-noise ratio in this low frequency range. Therefore, the depth of the pressure sensor is preferably chosen so that the frequency of the first spectral notch in the pressure sensor signal caused by the surface reflection is higher than the low frequency range in which the vertical velocity signal is calculated and substituted.

The method of the invention is particularly useful for towed marine seismic streamers, since the vibration of a towed streamer adds a significant amount of noise to the signal of the particle motion sensor. Thus the method of the invention will be illustrated in terms of towed streamers.

The method of the invention employs pressure sensors that are responsive to pressure changes in the medium to which the pressure sensors are coupled. The medium typically is water. For clarity only, the method of the invention will be illustrated by the use of hydrophones, but this is not meant to limit the invention.

The method of the invention employs particle motion sensors that are responsive to motions in the particles of the water to which the motion sensors are coupled. In general, particle motion sensors may be responsive to the displacement of the particles, the velocity of the particles, or the acceleration of the particles in the medium. In the present invention, particle velocity sensors are preferred. Thus, if motion sensors are used which are responsive to position, then preferably the position signal is differentiated to convert it to a velocity signal by computational means well known in the art. If motion sensors are used which are responsive to acceleration (typically called accelerometers), then preferably the acceleration signal is integrated to convert it to a velocity signal by computational means well known in the art.

In an alternative embodiment of the invention, multi-component motion sensors are employed in the seismic cable. For clarity only, this embodiment of the invention will be illustrated by the use of geophones, but this is not meant to limit the invention. In the particular example of a three-component geophone, a geophone is mounted to sense particle velocity in the vertical direction. This geophone is called a vertical geophone. Two geophones are mounted in orthogonal directions with respect to each other, and to the vertically mounted geophone, to sense horizontal motion. Typically, a three-component geophone is oriented to sense motion in the vertical direction, in an in-line direction, and in a cross-line direction. Positioning these geophones in these three directions enables the propagation direction of an incoming signal to be detected. It also enables the detection of strumming or other mechanical behavior of the seismic cable. For clarity, the method of the invention will be illustrated by the use of vertical geophones, but this is not meant to limit the invention.

Figure 1:
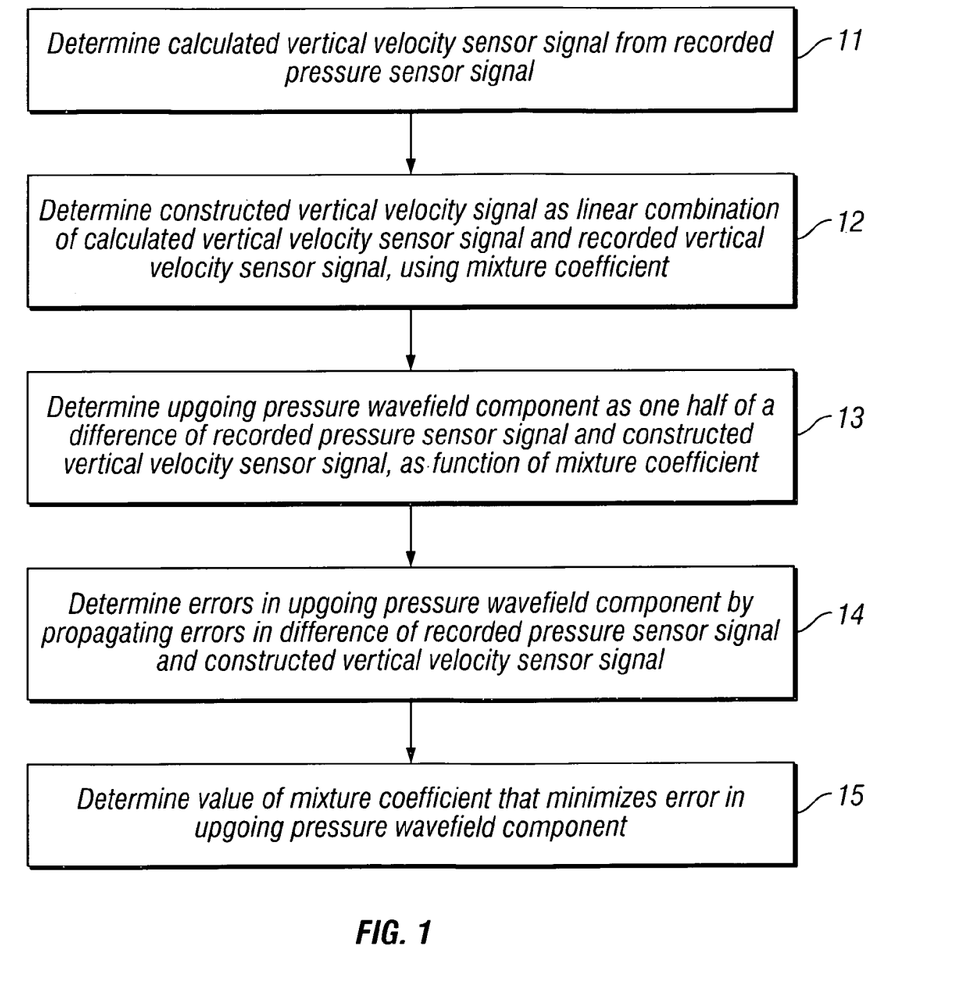
FIG. 1 is a flowchart illustrating a first embodiment of the invention for attenuating low frequency noise in dual-sensor seismic streamer data by combining pressure sensor and vertical velocity sensor signals.
Figure 2:
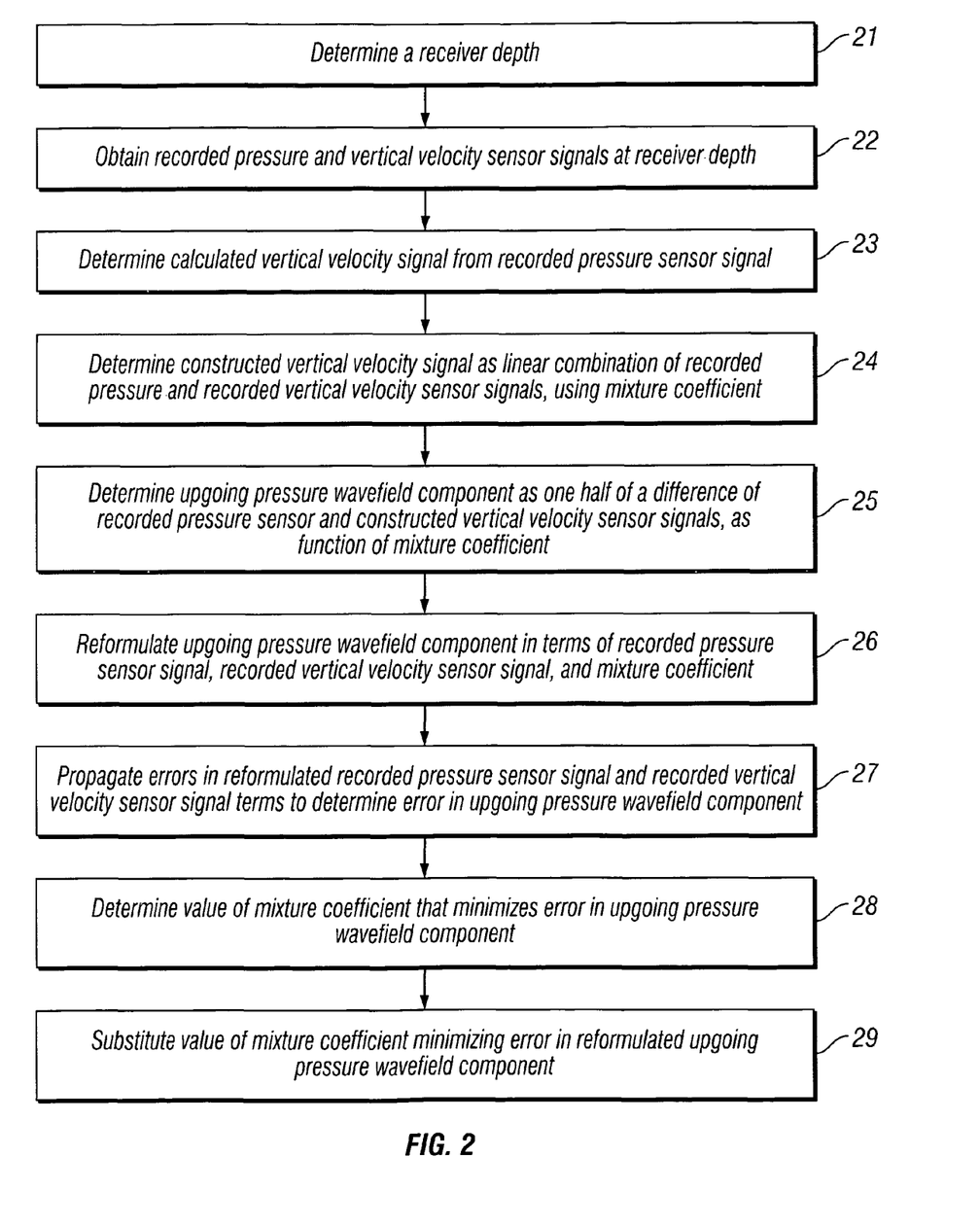
FIG. 2 is a flowchart illustrating a second embodiment of the invention for attenuating low frequency noise in dual-sensor seismic streamer data by combining pressure sensor and vertical velocity sensor signals.
Figure 3:
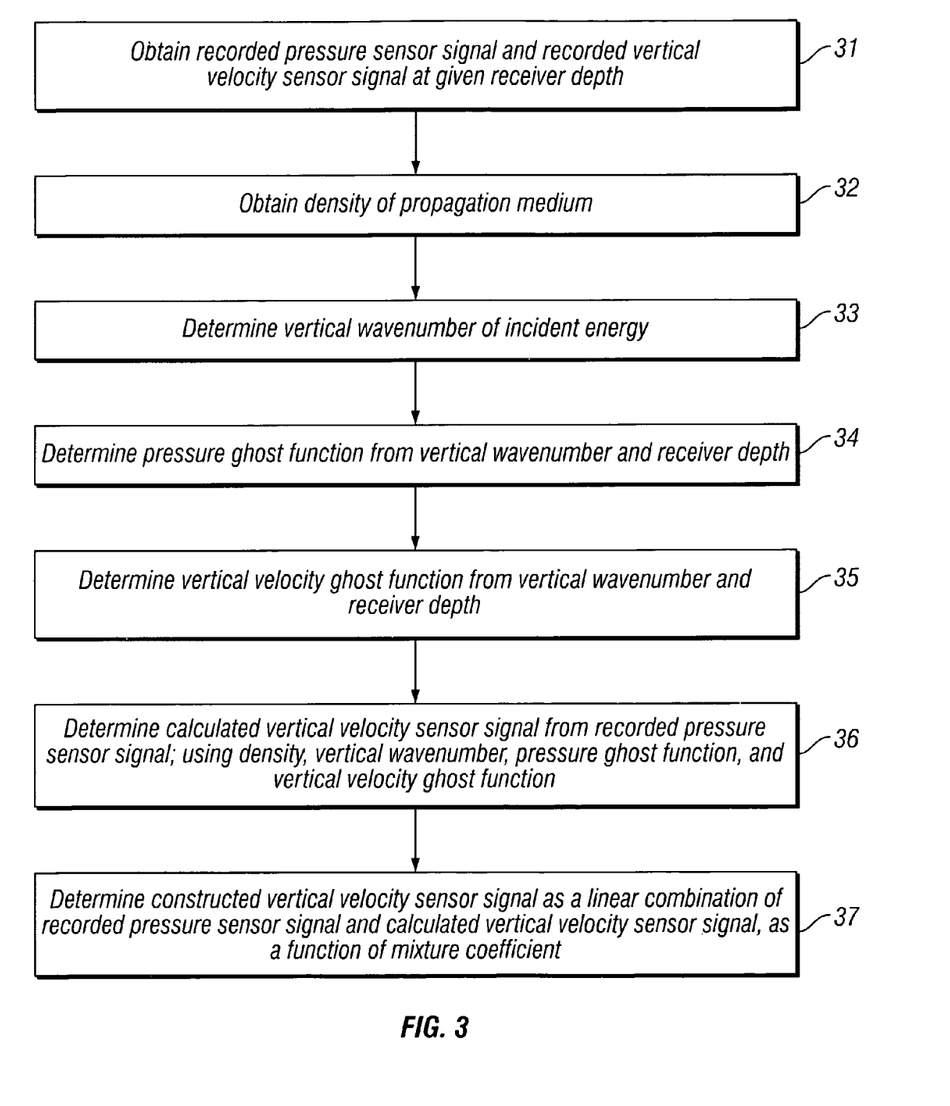
FIG. 3 is a flowchart illustrating an embodiment of the invention for determining a calculated vertical velocity signal.
Figure 4:
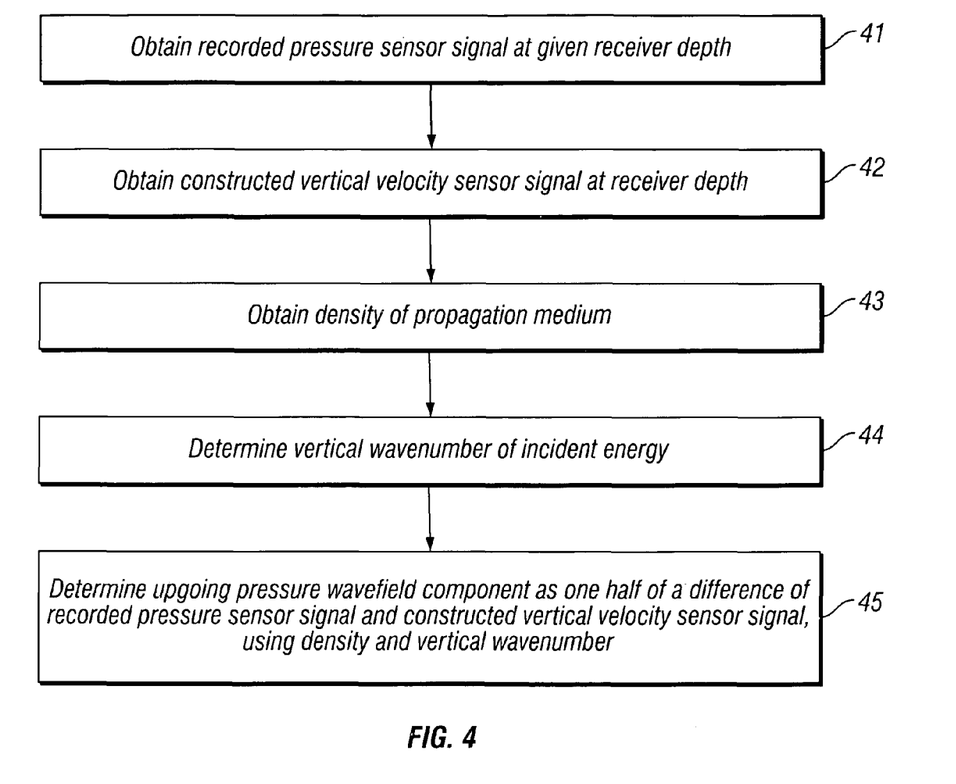
FIG. 4 is a flowchart illustrating an embodiment of the invention for determining an upgoing pressure wavefield component.
Figure 5:
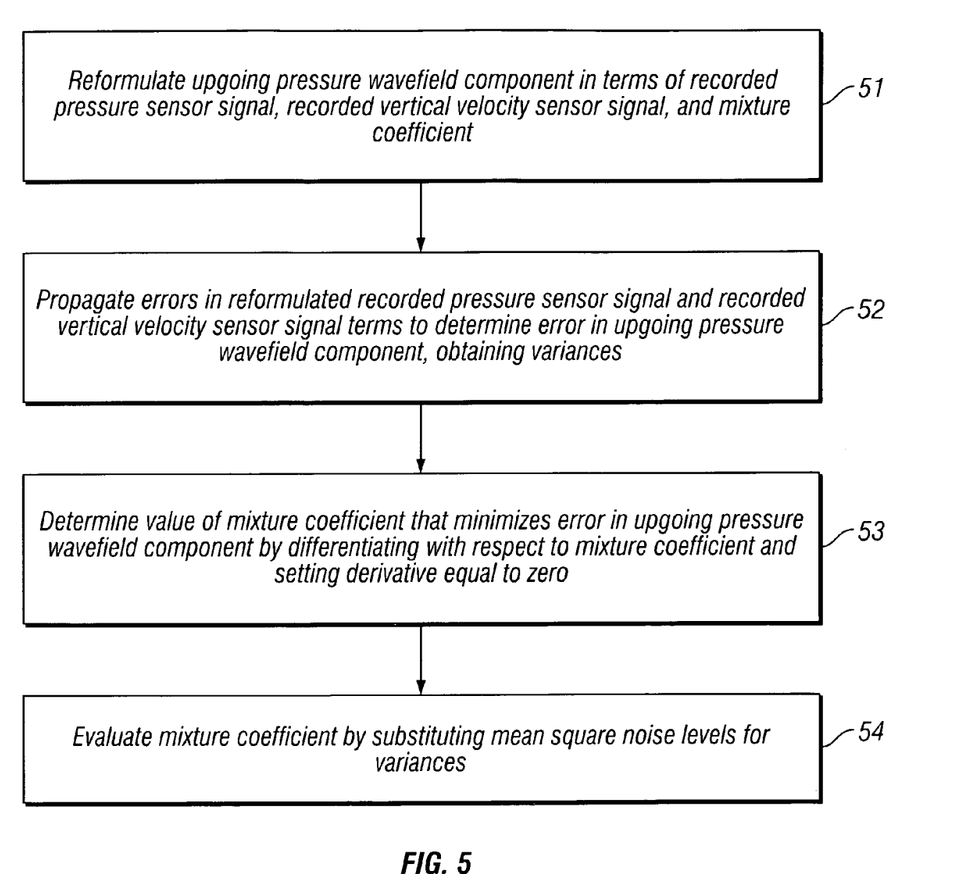
FIG. 5 is a flowchart illustrating an embodiment of the invention for determining a value of the mixture coefficient that minimizes the error.

The method of the invention will be illustrated by the following discussion with reference to the flowcharts presented in FIGS. 1-5. FIGS. 1 and 2 show flowcharts illustrating two embodiments of the invention for attenuating low frequency noise in dual-sensor seismic streamer data. FIGS. 3-5 show flowcharts further illustrating particular embodiments of the invention discussed with reference to the flowchart presented in FIG. 2. The following discussion will be carried out in the 2D frequency-wavenumber ($\omega$-$k_x$) domain for ease of illustration only, where 2D refers to two spatial dimensions, x and z. This choice of domains is not intended to restrict the invention. In particular, the extension to the 3D frequency-wavenumber ($\omega$-$k_x$-$k_y$) domain is straightforward and will be indicated in appropriate places in the discussion below.

FIG. 1 shows a flowchart illustrating a first embodiment of the invention for attenuating low frequency noise in dual-sensor seismic streamer data by combining pressure sensor and vertical velocity sensor signals.

In box 11, a calculated vertical velocity signal $V_z^{cal}$ is determined from a recorded pressure sensor signal $P^{rec}$ only. The calculated vertical velocity sensor signal $V_z^{cal}$ is preferably calculated in the noisy low frequency portion of a recorded vertical velocity sensor signal $V_z^{rec}$.

In box 12, a constructed vertical velocity sensor signal $V_z^{con}$ is determined as a linear combination of the calculated vertical velocity sensor signal $V_z^{cal}$ in box 11 and the recorded vertical velocity sensor signal $V_z^{rec}$, using a mixture coefficient $\alpha$. In a preferred embodiment, the constructed vertical velocity sensor signal $V_z^{con}$ is determined by a method such as the low frequency replacement process described above in the discussion of U.S. Pat. No. 7,359,283 B2.

In box 13, an upgoing pressure wavefield component $P^{up}$ is determined as one half of a difference of the recorded pressure sensor signal $P^{rec}$ and the constructed vertical velocity sensor signal $V_z^{con}$ from box 12, as a function of the mixture coefficient $\alpha$.

In box 14, errors in the recorded pressure sensor signal $P^{rec}$ and the constructed vertical velocity sensor signal $V_z^{con}$ terms from box 13 are propagated to determine the errors in the upgoing pressure wavefield component $P^{up}$.

In box 15, the value of the mixture coefficient $\alpha$ is determined that minimizes the error in the upgoing pressure wavefield component $P^{up}$ in box 14.

FIG. 2 shows a flowchart illustrating a second embodiment of the invention for attenuating low frequency noise in dual-sensor seismic streamer data by combining pressure sensor and vertical velocity sensor signals.

In box 21, a receiver depth $z^R$ is determined. The receiver depth $z^R$ may be determined by any means known in the art, such as by a depth sensor or a calculation.

In box 22, a recorded (measured) total pressure sensor signal $P^{rec}$ and a recorded (measured) total vertical velocity sensor signal $V_z^{rec}$ are obtained at the receiver depth determined in box 21. In one embodiment, the recorded pressure sensor signal $P^{rec}$ and the recorded vertical velocity sensor signal $V_z^{rec}$ are obtained from collocated pairs of (groups of) pressure sensors and vertical velocity sensors towed in a marine seismic streamer. Typically, the pressure sensors are hydrophones and the vertical velocity sensors are vertical geophones, but this choice of sensors is not to be considered as a limitation of the invention.

In box 23, a calculated vertical velocity sensor signal $V_z^{cal}$ is determined from the recorded pressure sensor signal $P^{rec}$ obtained in box 22. The calculated vertical velocity signal $V_z^{cal}$ can be represented in the 2D case by:

$$V_z^{cal}(k_x, z^R, \omega) = F \cdot P^{rec}(k_x, z^R, \omega), \quad (1)$$

where F is a factor to insure that the pressure sensor signal term on the right hand side of Equation (1) is equivalent in wavefield form to the vertical velocity sensor signal on the left hand side of Equation (2). The 2D calculated vertical velocity signal $V_z^{cal}$ in Equation (2) can also be represented in the 3D case by:

$$V_z^{cal}(k_x, k_y, z^R, \omega) = F \cdot P^{rec}(k_x, k_y, z^R, \omega).$$

A particular method for determining the calculated vertical velocity signal $V_z^{cal}$, including a particular expression for the factor F, is illustrated by the discussion with reference to the flowchart presented in FIG. 3, below.

In box 24, a constructed vertical velocity sensor signal $V_z^{con}$ is determined from the recorded vertical velocity sensor signal $V_z^{rec}$ obtained in box 22 and the calculated vertical velocity signal $V_z^{cal}$ determined in box 23 from the recorded pressure sensor signal $P^{rec}$ obtained in box 22. In one embodiment, the constructed vertical velocity signal $V_z^{con}$ is determined as a linear combination of the recorded vertical velocity sensor signal $V_z^{rec}$ and the calculated vertical velocity sensor signal $V_z^{cal}$, using a mixture coefficient $\alpha$ as a proportionality constant between the two sensor signals.

The constructed vertical velocity signal $V_z^{con}$ can be represented in the 2D case by:

$$\begin{aligned} V_z^{con}(k_x, z^R, \omega) &= (1-a) \cdot V_z^{rec}(k_x, z^R, \omega) + a \cdot V_z^{cal}(k_x, z^R, \omega) \quad (2) \\ &= (1-a) \cdot V_z^{rec}(k_x, z^R, \omega) + aF \cdot P^{rec}(k_x, z^R, \omega), \end{aligned}$$

using Equation (1) in the second line. The 2D constructed vertical velocity signal $V_z^{con}$ in Equation (2) can similarly be represented in the 3D case by:

$$\begin{aligned} V_z^{con}(k_x, k_y, z^R, \omega) &= (1-a) \cdot V_z^{rec}(k_x, k_y, z^R, \omega) + \\ &\quad a \cdot V_z^{cal}(k_x, k_y, z^R, \omega) \\ &= (1-a) \cdot V_z^{rec}(k_x, k_y, z^R, \omega) + \\ &\quad aF \cdot P^{rec}(k_x, k_y, z^R, \omega). \end{aligned}$$

A particular method for determining the constructed vertical velocity signal $V_z^{con}$ is illustrated by the discussion with reference to the flowchart presented in FIG. 3, below.

In box 25, the pressure wavefield is decomposed into upgoing and downgoing wavefield components. In one embodiment, the pressure wavefield decomposition is determined by calculating the upgoing pressure wavefield component $P^{up}$ as one half of a difference of the recorded pressure sensor signal $P^{rec}$ from box 22 and the constructed vertical velocity signal $V_z^{con}$ from box 24. The upgoing pressure wavefield component $P^{up}$ is then also a function of the mixture coefficient $\alpha$ from box 24. A particular embodiment for determining the upgoing pressure wavefield component $P^{up}$ is illustrated by the discussion with reference to the flowchart presented in FIG. 4, below.

In box 26, the upgoing pressure wavefield component $P^{up}$ is reformulated as a function of the recorded pressure sensor signal $P^{rec}$ from box 22, the recorded vertical velocity sensor signal $V_z^{rec}$ from box 22, and the mixture coefficient $\alpha$ from box 24. This reformulation is discussed in more detail below with reference to the flowchart in FIG. 5.

In box 27, errors in the reformulated recorded pressure sensor signal and recorded vertical velocity sensor signal terms from box 26 are propagated to determine the errors in the upgoing pressure wavefield component $P^{up}$. This propagation is discussed in more detail below with reference to the flowchart in FIG. 5.

In box 28, a value of the mixture coefficient α is determined that minimizes the error in the upgoing pressure wavefield component P$^{up}$ in box 27. A particular embodiment for determining the value of the mixture coefficient α that minimizes the error for the case in which the measurement noise is the sole source of error is illustrated by the discussion with reference to the flowchart presented in FIG. 5, below. This particular embodiment augments the discussion in boxes 26-28 above.

In box 29, the upgoing pressure wavefield component P$^{up}$ in box 27 is recalculated with the determined value of the mixture coefficient α from box 28 that minimizes the error.

FIG. 3 shows a flowchart illustrating one method for determining a calculated vertical velocity signal V$_z^{cal}$. This particular method was referred to in boxes 23 and 24 of FIG. 2. This method is analogous to the method described in U.S. Pat. No. 7,359,283 B2, discussed above.

In box 31, a recorded pressure sensor signal P$^{rec}$ and a recorded vertical velocity sensor signal V$_z^{rec}$ are obtained. In this particular 2D embodiment being illustrated, the recorded pressure sensor signal P$^{rec}(k_x, z^R, \omega)$ and the recorded vertical velocity sensor signal V$_z^{rec}(k_x, z^R, \omega)$ are given in terms of horizontal wavenumber $k_x$, a given receiver depth $z^R$, and temporal circular frequency ω.

In box 32, a density ρ of the propagation medium is obtained. For a towed marine seismic streamer, the medium will be water.

In box 33, a vertical wavenumber $k_z$ of the incident energy is determined for propagation in an inline vertical (x, z) plane so that:

$$\frac{\omega^2}{c^2} = k_x^2 + k_z^2, \quad (3)$$

where c is the propagation velocity of seismic energy in the medium. The 2D case expressed in Equation (3) is the case $k_y=0$ in the more general 3D case given by:

$$\frac{\omega^2}{c^2} = k_x^2 + k_y^2 + k_z^2,$$

In box 34, a pressure ghost function $g_p$ is determined. In this particular embodiment being illustrated, the pressure ghost function $g_p$ is given as a function of $k_z$ and $z^R$ by:

$$g_p(z^R, k_z) = 1 - \exp[-2ik_z z^R]. \quad (4)$$

In box 35, a vertical velocity ghost function $g_{v_z}$ is determined. In this particular embodiment being illustrated, the vertical velocity ghost function $g_{v_z}$ is given as a function of $k_z$ and $z^R$ by:

$$g_p(z^R, k_z) = 1 + \exp[-2ik_z z^R]. \quad (5)$$

In box 36, a calculated vertical velocity signal V$_z^{cal}$ is determined. In this particular embodiment being illustrated, the calculated vertical velocity signal V$_z^{cal}$ is determined using the density ρ from box 32, the vertical wavenumber $k_z$ from box 33, the pressure ghost function $g_p$ from box 34, and the vertical velocity ghost function $g_{v_z}$ from box 35. The calculated vertical velocity signal V$_z^{cal}$ is given for the 2D case by:

$$V_z^{cal}(k_x, z^R, \omega) = -\frac{k_z}{\omega \rho} \frac{g_{v_z}}{g_p} \cdot P^{rec}(k_x, z^R, \omega). \quad (6)$$

Equation (6) is a particular embodiment of Equation (1) for a particular value for the factor F. The 3D version of Equation (6) is given as:

$$V_z^{cal}(k_x, k_y, z^R, \omega) = -\frac{k_z}{\omega \rho} \frac{g_{v_z}}{g_p} \cdot P^{rec}(k_x, k_y, z^R, \omega).$$

The factor given by the ratio of ghost functions, $$\frac{g_{v_z}}{g_p}$$

on the right hand side of Equation (6) insures that the right hand term, although based upon a pressure sensor signal, is equivalent in wavefield form to the left hand side of Equation (6), which is based upon a vertical velocity sensor signal.

In box 37, a constructed vertical velocity signal V$_z^{con}$ is determined as a linear combination of the recorded pressure sensor signal P$^{rec}$ from box 31 and the calculated vertical velocity signal V$_z^{cal}$ from box 36, using a mixture coefficient α. In this particular embodiment being illustrated, the constructed vertical velocity signal V$_z^{con}$ is determined using Equation (6) and is given for the 2D case by:

$$V_z^{con}(k_x, z^R, \omega) = (1-a) \cdot V_z^{rec}(k_x, z^R, \omega) - a\frac{k_z}{\omega \rho} \frac{g_{v_z}}{g_p} \cdot P^{rec}(k_x, z^R, \omega). \quad (7)$$

Equation (7) is a particular embodiment of Equation (2). The 3D version of Equation (7) is given as:

$$V_z^{con}(k_x, k_y, z^R, \omega) = $$
$$(1-a) \cdot V_z^{rec}(k_x, k_y, z^R, \omega) - a\frac{k_z}{\omega \rho} \frac{g_{v_z}}{g_p} \cdot P^{rec}(k_x, k_y, z^R, \omega).$$

FIG. 4 shows a flowchart illustrating an embodiment of the invention for determining an upgoing pressure wavefield component. This particular embodiment was referred to in box 24 of FIG. 2.

In box 41, an recorded pressure sensor signal P$^{rec}$ is obtained. In this particular embodiment being illustrated, the pressure sensor signal P$^{rec}(k_x, z^R, \omega)$ is given in terms of horizontal wavenumber $k_x$, a given receiver depth $z^R$, and temporal circular frequency ω.

In box 42, a constructed vertical velocity sensor signal V$_z^{con}$ is obtained. In this particular embodiment being illustrated, the constructed vertical velocity sensor signal V$_z^{con}(k_x, z^R, \omega)$ is given in terms of horizontal wavenumber $k_x$, receiver depth $z^R$, and temporal circular frequency ω. A particular embodiment of a constructed vertical velocity sensor signal V$_z^{con}$ is illustrated by the discussion with reference to the flowchart presented in FIG. 3, above.

In box 43, a density ρ of the propagation medium is obtained. For a towed marine seismic streamer, the medium will be water.

In box 44, a vertical wavenumber $k_z$ is determined for propagation in an inline vertical (x, z) plane so that Equation (3) holds (as in box 33 of FIG. 3).

In box 45, an upgoing pressure wavefield component $P^{up}$ is determined as one half of a difference of the recorded pressure sensor signal $P^{rec}$ from box 41 and the constructed vertical velocity signal $V_z^{con}$ from box 42. In this particular embodiment being illustrated, the upgoing pressure wavefield component $P^{up}$ is determined using the density $\rho$ from box 43 and the vertical wavenumber $k_z$ from box 44; and is given by:

$$P^{up}(k_x, z^R, \omega) = \frac{1}{2}\left(P^{rec}(k_x, z^R, \omega) - \frac{\omega\rho}{k_z} \cdot V_z^{con}(k_x, z^R, \omega)\right). \quad (8)$$

The 3D version of Equation (8) is given as:

$$P^{up}(k_x, k_y, z^R, \omega) = \frac{1}{2}\left(P^{rec}(k_x, k_y, z^R, \omega) - \frac{\omega\rho}{k_z} \cdot V_z^{con}(k_x, k_y, z^R, \omega)\right).$$

The downgoing pressure wavefield component $P^{down}$ and the upgoing and downgoing vertical velocity wavefield components $V_z^{up}$ and $V_z^{down}$, respectively, may also be obtained by expressions analogous to Equation (8). The invention is equally applicable to determining any of these results of the decomposition process. The use of the upgoing pressure wavefield component $P^{up}$ here is for illustrative purposes only and is not intended as a restriction of the invention.

FIG. 5 shows a flowchart illustrating an embodiment of the invention for determining a value of the mixture coefficient that minimizes the error. This particular embodiment was referred to in boxes 26-28 of FIG. 2.

In box 51, the upgoing pressure wavefield component $P^{up}$ is reformulated in terms of the recorded pressure sensor signal $P^{rec}$, the recorded vertical velocity sensor signal $V_z^{rec}$, and the mixture coefficient $\alpha$. In this particular embodiment, the reformulation is accomplished by substituting Equation (7) into Equation (8) and suppressing the 2D parameters ($k_x$, $z^R$, $\omega$) or 3D parameters ($k_x$, $k_y$, $z^R$, $\omega$). This substitution yields:

$$2P^{up} = P^{rec} - \frac{\omega\rho}{k_z}\left((1-a)\cdot V_z^{rec} - a\frac{k_z}{\omega\rho}\frac{g_{v_z}}{g_p}\cdot P^{rec}\right). \quad (9)$$

The invention comprises the propagation of errors in any of the terms on the right hand side of Equation (9) to find the consequent error in the estimated decomposed upgoing pressure wavefield $P^{up}$, followed by the optimization of the estimate by adjusting the mixture coefficient $\alpha$ to achieve the lowest consequent error. The invention is not restricted to Equation (9) and also includes the use of functionally similar equations arising from different implementations of low frequency noise attenuation and of wavefield decomposition.

For example, a systematic error in the ratio of ghost functions, $$\frac{g_{v_z}}{g_p},$$

may arise if the sea surface topography or receiver depth are not uniform with respect to x and the ghost functions are not adequately represented by the Equations (4) and (5), or if the incident energy includes a non-zero $k_y$ component perpendicular to the streamer such that $k_z$ is not accurately obtained from Equation (3). The presence of these, or other, errors may make each of the recorded sensor signal $P^{rec}$ or $V_z^{rec}$ terms more or less desirable in Equation (7) and the mixture which achieves the minimum consequent error in the decomposition may be obtained by adjusting the mixture coefficient $\alpha$ accordingly for a given $\omega$ and $k_x$.

In box 52, errors in the terms on the right hand side of Equation (9) are propagated to determine the errors in the upgoing pressure wavefield component $P^{up}$ on the left hand side of Equation (9) in box 51. In this particular embodiment in which the measurement noise is the sole source of error, the noise is considered as variances in each term of Equation (9). This noise treatment yields:

$$4\text{Var}[P^{up}] = \left|1 + a\frac{g_{v_z}}{g_p}\right|^2 \text{Var}[P^{rec}] + \left(\frac{\omega\rho}{k_z}(1-a)\right)^2 \text{Var}[V_z^{rec}], \quad (10)$$

where $\text{Var}[\cdot]$ designates the variance.

In box 53, a value of the mixture coefficient $\alpha$ is determined that minimizes the variance of the upgoing pressure wavefield component, $\text{Var}[P^{up}]$, on the left hand side of Equation (10) in box 52. Rearrangement of the terms in Equation (10), differentiation with respect to the mixture coefficient $\alpha$, and setting $$\frac{\partial \text{Var}[P^{up}]}{\partial a}$$

to zero yields the value for $\alpha$ that provides the minimum $\text{Var}[P^{up}]$:

$$a = \frac{\left(\frac{\omega\rho}{k_z}\right)^2 \text{Var}[V_z^{rec}]}{\left(\frac{\omega\rho}{k_z}\right)^2 \text{Var}[V_z^{rec}] + \left|\frac{g_{v_z}}{g_p}\right|^2 \text{Var}[P^{rec}]}. \quad (11)$$

In box 54, the mixture coefficient $\alpha$ is evaluated by substituting the following form for Equation (11):

$$a = \frac{N^2[V_z^{rec}]}{N^2[V_z^{rec}] + N^2[V_z^{cal}]}, \quad (12)$$

where $N[\cdot]$ designates the root mean square noise level, obtained from a pure noise recording or by estimation from the data. Here, $V_z^{rec}$ is the recorded vertical velocity sensor signal and $V_z^{cal}$ is the equivalent vertical velocity sensor signal obtained entirely by calculation (flat sea surface deghosting) from the pressure sensor signal. In practice, Equation (12) is the most straightforward procedure for evaluating Equation (11).

FIGS. 6-10 show graphs of relative signal and noise illustrating particular processes in the flowcharts in FIGS. 1-5. In particular, FIGS. 6-10 illustrate the particular case in which the measurement noise is the sole source of error.

Figure 6:
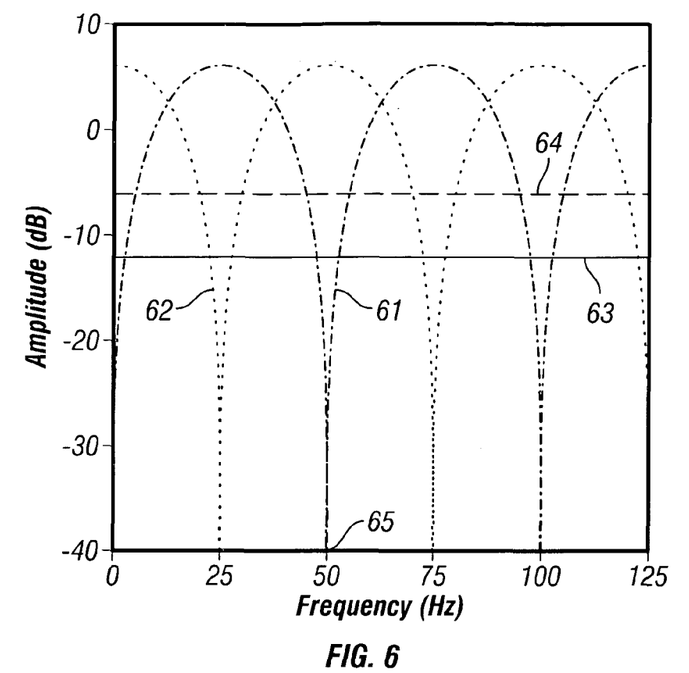
FIG. 6 is a graph of signal and noise for recorded pressure sensor and vertical velocity sensor signals.

FIG. 6 is a graph of signal and noise for recorded pressure sensor and vertical velocity sensor signals. In particular, FIG. 6 shows the signals for the recorded pressure sensor signal $P^{rec}$ 61 (dash-dot line) and the recorded vertical velocity sensor signal $V_z^{rec}$ 62 (dotted line) and the noise for the recorded pressure sensor signal $P^{rec}$ 63 (solid line) and the recorded vertical velocity sensor signal $V_z^{rec}$ 64 (dashed line). The signals 61, 62 and noise 63, 64 for both sensors are shown as recorded at vertical incidence and with 0 dB as the reference level of an upgoing signal on each sensor. For the sake of simplicity of illustration, the noise 63 on $P^{rec}$ is specified at a constant level of −12 dB and the noise 64 on $V_z^{rec}$ is specified at −6 dB at all frequencies. In practice, the noise 64 on $V_z^{rec}$ will rise towards 0 Hz and the low frequency replacement process will act primarily below the second $P^{rec}$ ghost notch 65, which is at about 50 Hz in this example with a 15 m recording depth.

Figure 7:
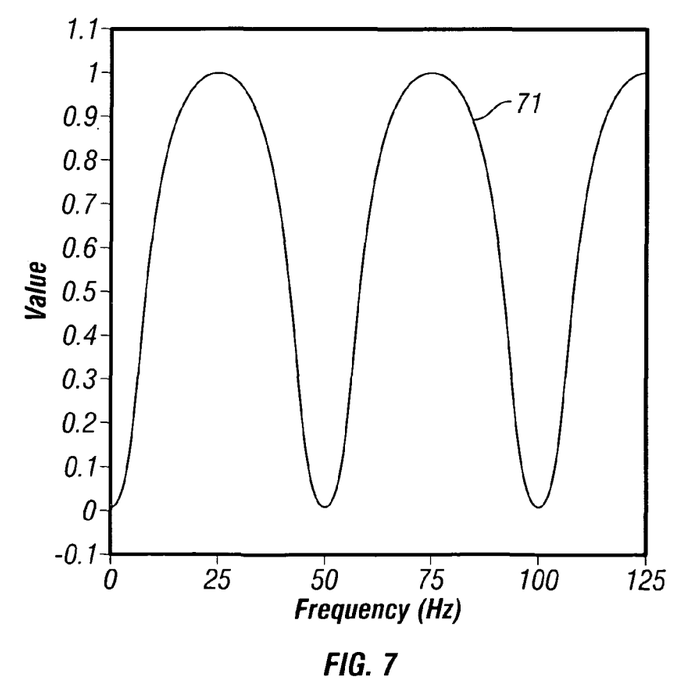
FIG. 7 is a graph of the mixture coefficient α determined by the method of the invention for the noise scenario illustrated in FIG. 6.

FIG. 7 shows a graph of the mixture coefficient α 71 (solid line) determined by the method of the invention for the noise scenario illustrated in FIG. 6. In particular, the optimum mixture coefficient α is determined by applying Equation (12). Where the mixture coefficient α=0, then $V_z^{con}$ will consist entirely of $V_z^{rec}$. Where the mixture coefficient α=1, then $V_z^{con}$ will consist entirely of $V_z^{cal}$, the equivalent signal and noise constructed from $P^{rec}$.

Figure 8:
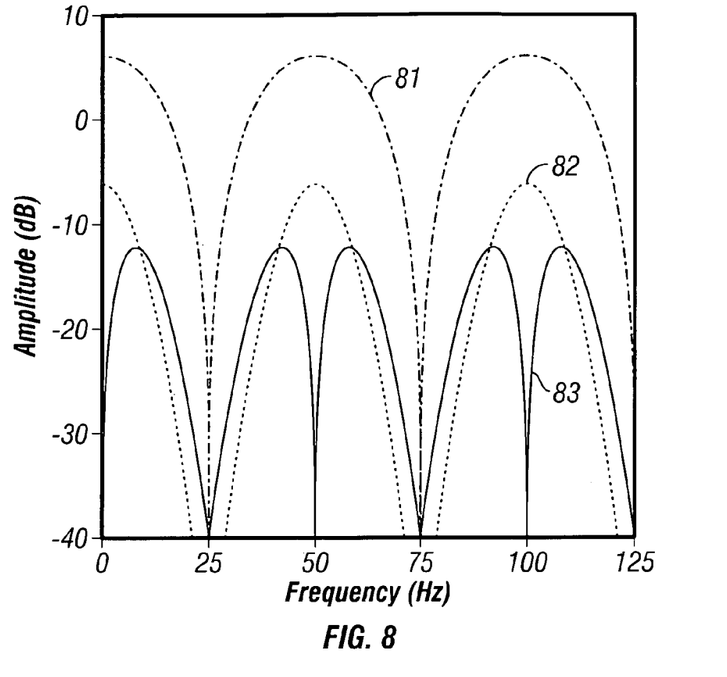
FIG. 8 is a graph of the constructed vertical velocity signal and noise contributions from the recorded pressure and vertical velocity sensor signals.

FIG. 8 shows a graph of the constructed vertical velocity signal $V_z^{con}$ 81 (dash-dot line), which is the sum of the two signal contributions from the recorded vertical velocity and pressure sensor signals. Also shown are the two individual noise contributions to $V_z^{con}$ from the recorded vertical velocity sensor signal $V_z^{rec}$ 82 (dotted line) and the recorded pressure sensor signal $P^{rec}$ 83 (solid line).

Figure 9:
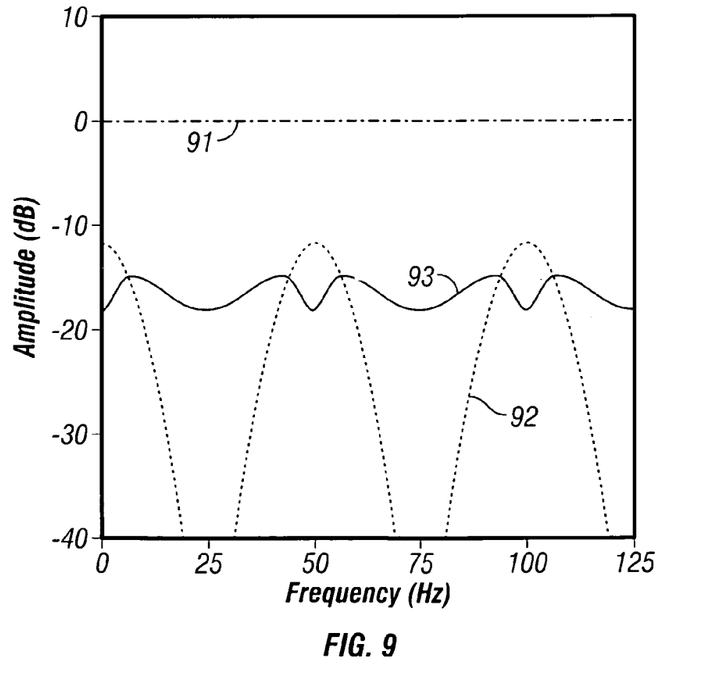
FIG. 9 is a graph of the upgoing pressure wavefield component and noise contributions from the recorded pressure and vertical velocity sensor signals.

Similarly, FIG. 9 shows a graph of the upgoing pressure wavefield component $P^{up}$ 91 (dash-dot line), which is the sum of the two signal contributions from the recorded vertical velocity and pressure sensor signals. Also shown are the two individual noise contributions to $P^{up}$ from the recorded vertical velocity sensor signal $V_z^{rec}$ 92 (dotted line) and the recorded pressure sensor signal $P^{rec}$ 93 (solid line). The $P^{rec}$ noise term 93 includes the portion of $V_z^{con}$ that comes from $P^{rec}$ before $P^{rec}$ and $V_z^{con}$ are combined to form $P^{up}$.

Figure 10:
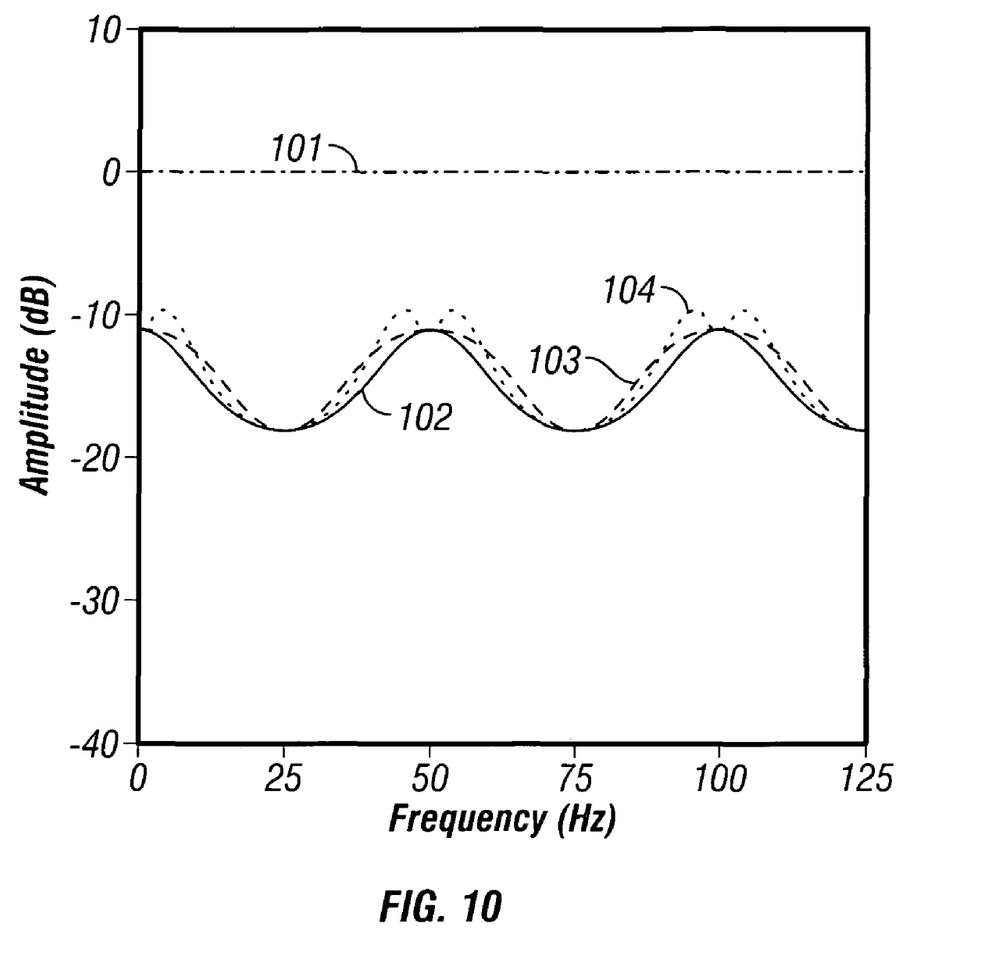
FIG. 10 is a graph of signal and noise for the up-going pressure wavefield component for a mixture coefficient α calculated by the method of the invention, shown in FIG. 7, and for two other suboptimal calculations.

FIG. 10 shows a graph of signal 101 (dash-dot line) and noise for the up-going pressure wavefield component $P^{up}$ for three calculations of the mixture coefficient α. The total $P^{up}$ noise is shown for mixture coefficient α as calculated by the method of the invention 102 (solid line) and shown in FIG. 7, above. The $P^{up}$ noise is also shown for two other slightly suboptimal calculations for comparison. In one calculation 103 (dashed line), the $V_z^{con}$ noise in the denominator of Equations (11) and (12) has been multiplied by two to yield a smaller value for α, while in the other calculation 104 (dotted line), the $V_z^{con}$ noise has been divided by two to yield a larger value for α. The value for α yielded by the method of the invention 102 yields the lowest noise at all frequencies.

The invention can use the derived mixture coefficient α not only for determining an optimal combination of the measurements from each sensor, but also as a tool for analysis of the relative importance of noise and other sources of error in low frequency noise attenuation and wavefield decomposition. The invention can also apply the same error propagation and optimization procedure to other implementations, for example, in different domains and in two or three dimensions. The invention further includes any other approximations to the general case illustrated here, for example by considering only certain sources of error or by assuming vertical or restricted incidence angles so that the derived value of α is a function only of ω and not of $k_x$.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for geophysical prospecting, comprising:
    disposing pressure and vertical velocity sensors in a seismic streamer in a body of water;
    responsive to signals received from the pressure and vertical velocity sensors, calculating seismic traces representing physical wavefields in the body of water incident on the sensors; and
    transforming the seismic traces to produce vertical velocity traces representing vertical velocity wavefields with attenuated low frequency noise, the transforming comprising:
        determining a calculated vertical velocity sensor trace from a recorded pressure sensor trace;
        determining a constructed vertical velocity sensor trace as a linear combination of the calculated vertical velocity sensor trace and a recorded vertical velocity sensor trace, using a mixture coefficient as a proportionality constant;
        determining an upgoing pressure wavefield component trace as one half of a difference of the recorded pressure sensor trace and the constructed vertical velocity sensor trace, as a function of the mixture coefficient;
        determining an error in the upgoing pressure wavefield component trace by propagating errors in the recorded pressure sensor trace and constructed vertical velocity sensor trace terms; and
        determining a value of the mixture coefficient that minimizes the error in the upgoing pressure wavefield component trace; and
    recording the constructed vertical velocity sensor trace.

2. The method of claim 1, wherein the determining a calculated vertical velocity sensor signal initially comprises:
    determining a receiver depth; and
    obtaining the recorded pressure sensor trace and the recorded vertical velocity sensor trace at the receiver depth.

3. The method of claim 1, wherein the pressure sensors comprise hydrophones.

4. The method of claim 1, wherein the vertical velocity sensors comprise vertical geophones.

5. The method of claim 2, wherein the determining a calculated vertical velocity sensor trace further comprises:
    obtaining a density of propagation medium;
    determining a vertical wavenumber from temporal circular frequency, propagation velocity in medium, and horizontal wavenumber;
    determining a pressure ghost function from the vertical wavenumber and the receiver depth;
    determining a vertical velocity ghost function from the vertical wavenumber and the receiver depth; and
    determining the calculated vertical velocity sensor trace using the density, vertical wavenumber, pressure ghost function, and the vertical velocity ghost function.

6. The method of claim 5, wherein the vertical wavenumber $k_z$ is determined in the two-dimensional case by applying the following equation:

$$\frac{\omega^2}{c^2} = k_x^2 + k_z^2,$$

where ω is the temporal circular frequency, c is the propagation velocity of seismic energy in the medium, and $k_x$ is the horizontal wavenumber in the inline direction.

7. The method of claim 5, wherein the vertical wavenumber $k_z$ is determined in the three-dimensional case by applying the following equation:

$$\frac{\omega^2}{c^2} = k_x^2 + k_y^2 + k_z^2,$$

where ω is the temporal circular frequency, c is the propagation velocity of seismic energy in the medium, $k_x$ is the horizontal wavenumber in the inline direction and $k_y$ is the horizontal wavenumber in the crossline direction.

8. The method of claim 6, wherein the pressure ghost function $g_p$ is determined by applying the following equation:

$$g_p(z^R, k_z) = 1 - \exp[-2ik_z z^R],$$

where $k_z$ is the vertical wavenumber and $z^R$ is the receiver depth.

9. The method of claim 8, wherein the vertical velocity ghost function $g_{v_z}$ is determined by applying the following equation:

$$g_{v_z}(z^R, k_z) = 1 + \exp[-2ik_z z^R].$$

10. The method of claim 9, wherein the determining the constructed vertical velocity sensor trace $V_z^{con}$ comprises applying the following equation:

$$V_z^{con}(k_x, z^R, \omega) = (1-a) \cdot V_z^{rec}(k_x, z^R, \omega) - a \frac{k_z}{\omega \rho} \frac{g_{v_z}}{g_p} \cdot P^{rec}(k_x, z^R, \omega),$$

where α is the mixture coefficient, $V_z^{rec}$ is the recorded vertical velocity sensor trace, and $P^{rec}$ is the recorded pressure sensor trace.

11. The method of claim 10, wherein the determining the upgoing pressure wavefield component trace uses the density and the vertical wavenumber.

12. The method of claim 11, wherein the determining the upgoing pressure wavefield component trace $P^{up}$ comprises applying the following equation:

$$P^{up}(k_x, z^R, \omega) = \frac{1}{2}\left(P^{rec}(k_x, z^R, \omega) - \frac{\omega \rho}{k_z} \cdot V_z^{con}(k_x, z^R, \omega)\right),$$

where $P^{rec}$ is the recorded pressure sensor trace signal and $V_z^{con}$ is the constructed vertical velocity sensor trace.

13. The method of claim 1, wherein the determining an error in the upgoing pressure wavefield component trace comprises:
  reformulating the upgoing pressure wavefield component trace in terms of the recorded pressure sensor trace, the recorded vertical velocity sensor trace, and the mixture coefficient;
  propagating errors in the recorded pressure sensor trace and recorded vertical velocity sensor trace terms to obtain variances in the upgoing pressure wavefield component trace, the recorded pressure sensor trace, and the recorded vertical velocity sensor trace terms;
  differentiating the variances with respect to the mixture coefficient; and
  determining the value of the mixture coefficient that minimizes the error in the upgoing pressure wavefield component trace by setting the derivative of the variance of the upgoing pressure wavefield component to zero.

14. The method of claim 13, wherein the reformulating the upgoing pressure wavefield component trace comprises applying the following equation:

$$2P^{up} = P^{rec} - \frac{\omega \rho}{k_z}\left((1-a)V_z^{rec} - a \frac{k_z}{\omega \rho} \frac{g_{v_z}}{g_p} \cdot P^{rec}\right).$$

15. The method of claim 14, wherein the propagating errors to obtain variances comprises applying the following equation:

$$4\text{Var}[P^{up}] = \left|1 + a\frac{g_{v_z}}{g_p}\right|^2 \text{Var}[P^{rec}] + \left(\frac{\omega \rho}{k_z}(1-a)\right)^2 \text{Var}[V_z^{rec}],$$

where Var[·] designates the variance.

16. The method of claim 15, wherein the determining of the value of the mixture coefficient that minimizes the error in the upgoing pressure wavefield component trace comprises applying the following equation:

$$a = \frac{\left(\frac{\omega \rho}{k_z}\right)^2 \text{Var}[V_z^{rec}]}{\left(\frac{\omega \rho}{k_z}\right)^2 \text{Var}[V_z^{rec}] + \left|\frac{g_{v_z}}{g_p}\right|^2 \text{Var}[P^{rec}]}.$$

17. The method of claim 16, wherein the determining of the value of the mixture coefficient that minimizes the error in the upgoing pressure wavefield component trace comprises applying the following equation:

$$a = \frac{N^2[V_z^{rec}]}{N^2[V_z^{rec}] + N^2[V_z^{cal}]},$$

where N[·] designates the root mean square noise level, $V_z^{rec}$ is the recorded vertical velocity sensor signal and $V_z^{cal}$ is an equivalent vertical velocity sensor signal obtained by flat sea surface deghosting of the pressure sensor signal.

18. A method for geophysical prospecting a, comprising:
  disposing pressure and vertical velocity sensors in a seismic streamer in a body of water;
  responsive to signals received from the pressure and vertical velocity sensors, calculating seismic traces representing physical wavefields in the body of water incident on the sensors; and
  transforming the seismic traces to produce vertical velocity traces representing vertical velocity wavefields with attenuated low frequency noise, the transforming comprising:
    determining a calculated vertical velocity sensor trace from a recorded pressure sensor trace;
    determining a constructed vertical velocity sensor trace as a linear combination of the calculated vertical velocity sensor trace and a recorded vertical velocity sensor trace, using a mixture coefficient as a proportionality constant;
    determining a downgoing pressure wavefield component trace as one half of a sum of the recorded pressure sensor trace and the constructed vertical velocity sensor trace, as a function of the mixture coefficient;

determining an error in the downgoing pressure wavefield component trace by propagating errors in the recorded pressure sensor trace and constructed vertical velocity sensor trace terms; and determining a value of the mixture coefficient that minimizes the error in the downgoing pressure wavefield component trace; and recording the constructed vertical velocity sensor trace.

* * * * *